(12) United States Patent
Li

(10) Patent No.: US 12,496,978 B2
(45) Date of Patent: Dec. 16, 2025

(54) LUGGAGE BOX

(71) Applicant: Carman Enterprise Co., Ltd., Hangzhou (CN)

(72) Inventor: Xianwei Li, Hangzhou (CN)

(73) Assignee: Carman Enterprise Co., Ltd. (CN)

( * ) Notice: Subject to any disclaimer, the term of this patent is extended or adjusted under 35 U.S.C. 154(b) by 271 days.

(21) Appl. No.: 18/304,550

(22) Filed: Apr. 21, 2023

(65) Prior Publication Data

US 2023/0398944 A1 Dec. 14, 2023

(30) Foreign Application Priority Data

Jun. 10, 2022 (CN) .......................... 202210654994.3

(51) Int. Cl.
*B60R 9/06* (2006.01)
*B60R 9/045* (2006.01)

(52) U.S. Cl.
CPC .............. *B60R 9/045* (2013.01); *B60R 9/065* (2013.01)

(58) Field of Classification Search
CPC ........... B60R 9/045; B60R 9/055; B60R 9/10; B60R 9/065
USPC ................................ 220/9.2; 403/263, 322.4
See application file for complete search history.

(56) References Cited

U.S. PATENT DOCUMENTS

| | | | |
|---|---|---|---|
| 2,019,636 A | 11/1935 | Scrantom | |
| 4,823,997 A | 4/1989 | Krieger | |
| 5,038,983 A * | 8/1991 | Tomososki | B60R 9/065 |
| | | | 224/527 |
| 5,586,702 A | 12/1996 | Sadler | |
| 5,690,259 A | 11/1997 | Montani | |
| 5,862,966 A | 1/1999 | Mehls | |
| 5,947,357 A | 9/1999 | Surkin | |
| 6,047,869 A | 4/2000 | Chiu | |
| 6,089,394 A | 7/2000 | Ziglar | |

(Continued)

FOREIGN PATENT DOCUMENTS

| | | | |
|---|---|---|---|
| CN | 118871323 A * | 10/2024 | ................ B60P 3/38 |
| DE | 299 16 746 U1 | 1/2000 | |

(Continued)

OTHER PUBLICATIONS

International Search Report dated Jan. 16, 2023, for application EP 22184361.8, 6 pages.

(Continued)

*Primary Examiner* — Justin M Larson
(74) *Attorney, Agent, or Firm* — Thorpe North & Western, LLP

(57) ABSTRACT

The present invention relates to a luggage box (1), in particular for releasable attachment to a rear load carrier (36) to be mounted to a vehicle, the luggage box (1) comprising
a rigid bottom element (2),
a rigid cover element (3), and
side walls (8) made of fabric,
wherein the luggage box (1) is foldable between a use configuration, in which the bottom element (2) and the cover element (3) are spaced apart from one another and the side walls (8) connect the bottom element (2) and the cover element (3), thus forming a luggage receiving space inside, and a transport configuration, in which the cover element (3) lies on the bottom element (2) and the side walls (8) are folded in between the cover element (3) and the bottom element (2) and a rear load carrier (36) for mounting to a vehicle.

6 Claims, 12 Drawing Sheets

(56) References Cited

U.S. PATENT DOCUMENTS

Figure 1:
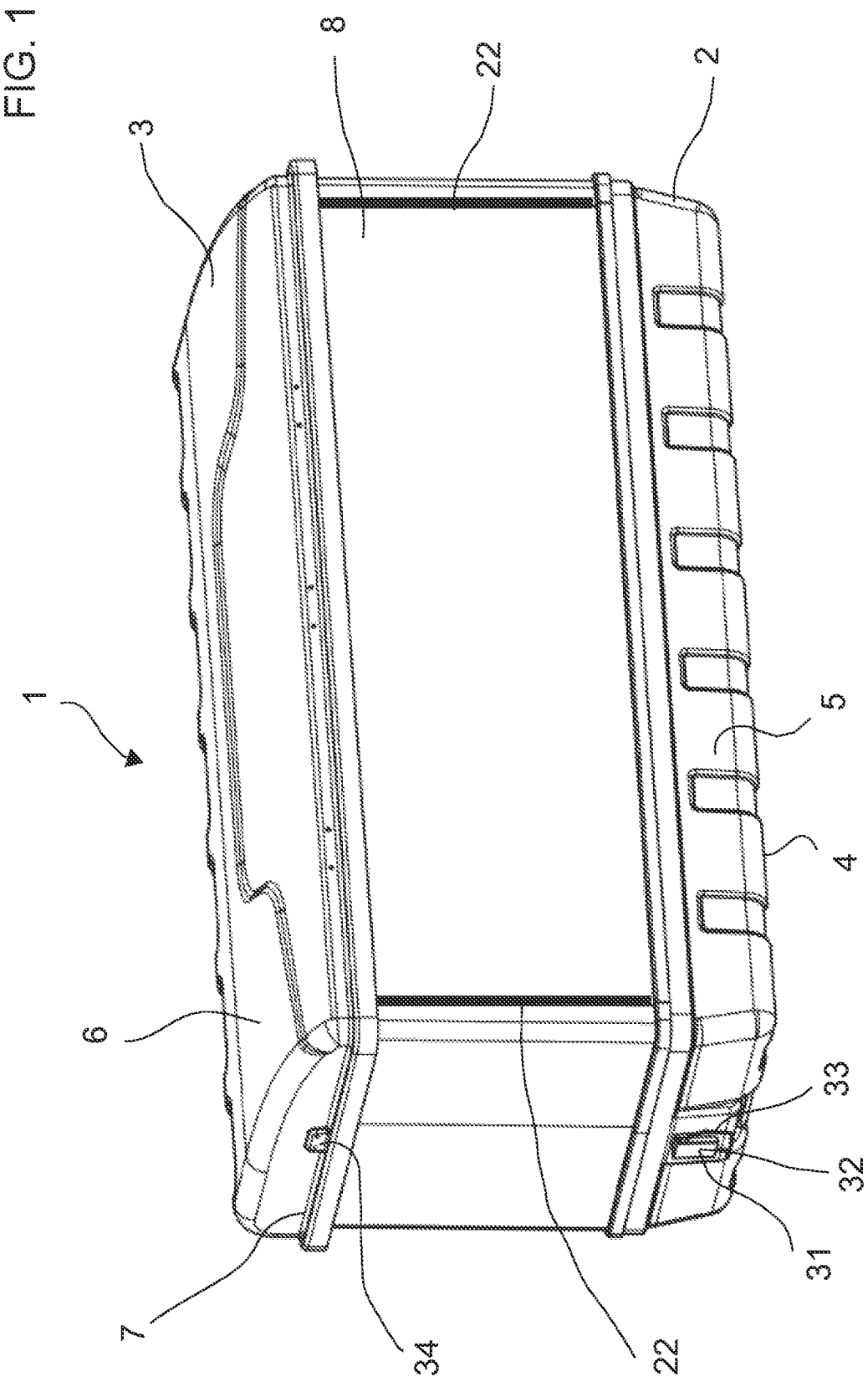

| | | | |
|---|---|---|---|
| 6,152,341 A | 11/2000 | Lemay | |
| 6,168,058 B1 * | 1/2001 | Janek | B60R 9/065 220/9.3 |
| 6,244,483 B1 | 6/2001 | McLemore | |
| 6,491,195 B1 | 12/2002 | McLemore | |
| 6,539,895 B2 * | 4/2003 | Hoagland | A01K 1/0245 119/453 |
| 6,866,009 B2 * | 3/2005 | Smith, Jr. | A01K 1/0254 119/840 |
| 7,789,044 B2 * | 9/2010 | McGrade | A01K 1/0254 119/498 |
| 8,047,391 B2 * | 11/2011 | Lu | A01K 1/033 220/9.3 |
| 8,496,148 B2 | 7/2013 | Farney | |
| 8,763,870 B2 | 7/2014 | Davis | |
| 9,096,182 B1 | 8/2015 | Roth et al. | |
| 10,010,048 B2 * | 7/2018 | Kellogg | A01K 1/033 |
| 10,059,276 B2 | 8/2018 | Phillips | |
| 10,183,627 B1 | 1/2019 | Liu | |
| 10,576,903 B2 | 3/2020 | Rodriguez | |
| 10,967,805 B2 | 4/2021 | Wang | |
| 11,046,379 B2 | 6/2021 | Tsai | |
| 11,148,607 B1 | 10/2021 | Hsieh | |
| 11,240,991 B2 * | 2/2022 | Zhuo | E04H 15/48 |
| 12,187,236 B2 | 1/2025 | Huo | |
| 2003/0132259 A1 | 7/2003 | McLemore | |
| 2003/0222112 A1 | 12/2003 | McLemore | |
| 2008/0006664 A1 | 1/2008 | Bergerhoff | |
| 2008/0142559 A1 | 6/2008 | Lim et al. | |
| 2009/0058103 A1 * | 3/2009 | Whitney | E05C 19/14 292/247 |
| 2009/0229093 A1 | 9/2009 | Zwanenburg | |
| 2011/0108592 A1 | 5/2011 | Lee | |
| 2011/0132946 A1 | 6/2011 | Sautter | |
| 2013/0062383 A1 | 3/2013 | Jeli | |
| 2014/0158729 A1 | 6/2014 | Pedrini | |
| 2015/0021371 A1 | 1/2015 | Ward | |
| 2015/0321620 A1 | 11/2015 | Lungershausen | |
| 2016/0068111 A1 | 3/2016 | Walker et al. | |
| 2017/0349111 A1 | 12/2017 | Ramsdell | |
| 2018/0072237 A1 | 3/2018 | Kuschmeader | |
| 2019/0381947 A1 | 12/2019 | Fehr | |
| 2021/0170955 A1 | 6/2021 | Nusbaum | |
| 2022/0144181 A1 | 5/2022 | Garai Abrisketa | |
| 2022/0153205 A1 | 5/2022 | Kuschmeader | |
| 2022/0176886 A1 | 6/2022 | Sailer | |
| 2023/0398944 A1 * | 12/2023 | Li | B60R 9/055 |
| 2023/0398946 A1 | 12/2023 | Li | |
| 2023/0398947 A1 | 12/2023 | Li | |
| 2023/0398948 A1 | 12/2023 | Li | |
| 2024/0253575 A1 | 8/2024 | Nilvius | |
| 2024/0351529 A1 | 10/2024 | Li | |
| 2024/0399972 A1 | 12/2024 | Willems | |

FOREIGN PATENT DOCUMENTS

| | | | |
|---|---|---|---|
| DE | 9916746 U1 | 1/2000 | |
| DE | 102 57 903 A1 | 6/2004 | |
| DE | 20 2010 016 281 U1 | 2/2011 | |
| DE | 10 2010 012 744 A1 | 9/2011 | |
| EP | 1502818 A1 | 2/2005 | |
| EP | 1 837 240 A1 | 9/2007 | |
| EP | 2 338 739 A1 | 6/2011 | |
| EP | 3 581 436 A1 | 12/2019 | |
| FR | 2 769 880 A1 | 4/1999 | |
| FR | 2905644 A1 * | 3/2008 | B60R 9/045 |
| JP | 2010042805 A | 2/2010 | |
| JP | 2017-081320 A | 5/2017 | |
| KR | 1010 474661 B1 | 12/2014 | |
| KR | 20240169346 A * | 12/2024 | |
| SE | 535620 C2 * | 10/2012 | B60R 9/045 |
| SE | 536070 C2 * | 4/2013 | B60R 9/045 |
| WO | WO 2013/022671 A1 | 2/2013 | |
| WO | WO 2022/064290 A1 | 3/2022 | |

OTHER PUBLICATIONS

European Search Report dated Oct. 2, 2022, for application No. 22184972.2-1009, 7 pages.
International Search Report for European Application No. 22185249.4-1009 dated May 24, 2023, 7 pages.
European Search Report dated Sep. 3, 2021, for Application No. 21176694.4, 6 pages.
International Search Report for European Application No. 2185257.7-1009 dated May 24, 2023, 8 pages.

* cited by examiner

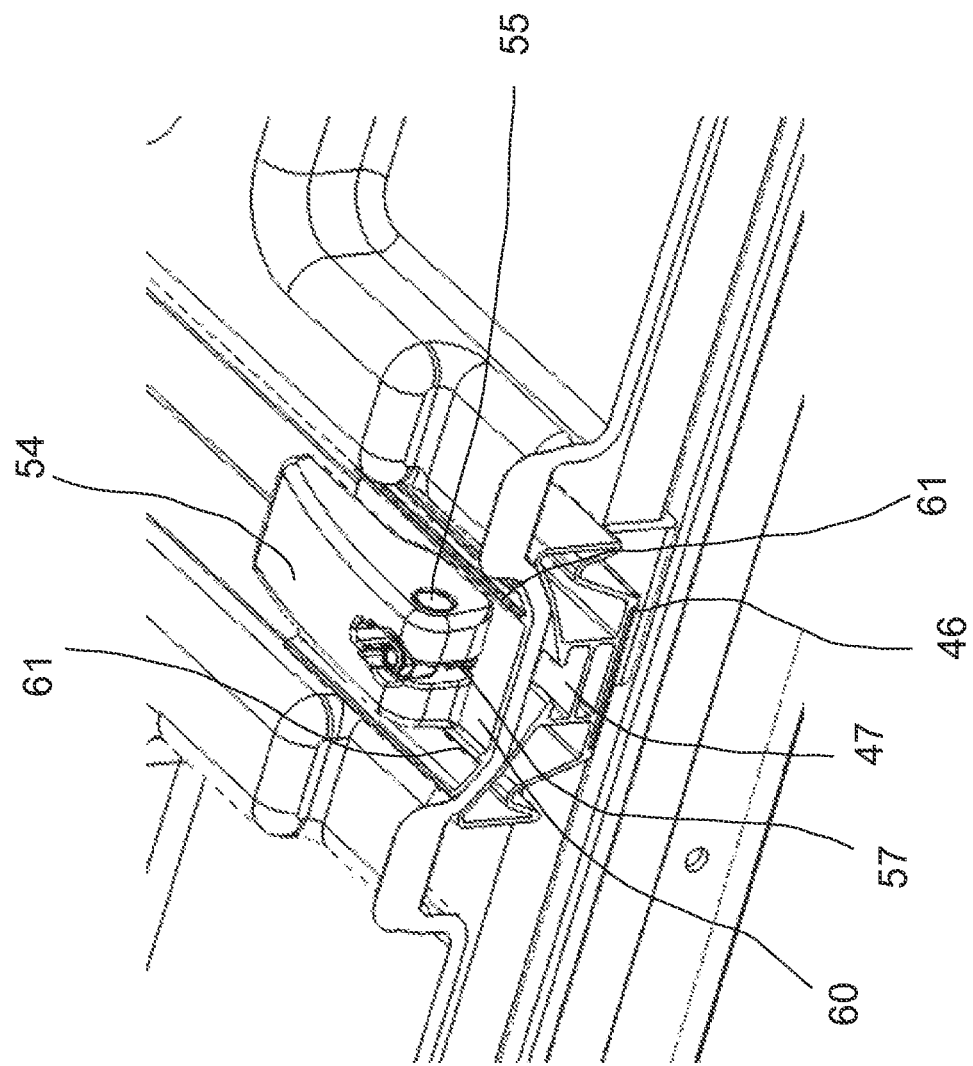

LUGGAGE BOX

The present invention relates to a luggage box, in particular for releasable attachment to a rear load carrier to be mounted to a vehicle. Furthermore, the invention relates to a rear load carrier with such a luggage box.

Load carriers for fastening to the rear end of a vehicle, in particular a motor vehicle such as a car, are often used for transporting loads that do not fit into the luggage compartment of the vehicle. Generally, such a load carrier comprises a connecting device at its front end region which is normally designed so that the load carrier can be fastened to the ball of a conventional trailer coupling.

Such load carriers can carry a luggage box, by means of which additional luggage which exceeds the capacity of the luggage compartment of a vehicle can be transported. Such a luggage box is normally characterized in that it is closed thus defining an interior luggage receiving space in order to protect the luggage to be transported against dirt and water. Luggage boxes, which are or can be releasably attached to a rear load carrier, have proven its worth in principal. However, it is sometimes considered as disadvantageous that the luggage box requires a lot of space when not in use, in particular, when the luggage box should be transported or stored over a longer time.

Accordingly, it is a task of the present invention to provide an alternative luggage box which is easy to transport and to store when not in use.

This object is solved by a luggage box comprising a rigid bottom element, a rigid cover element and side walls made of fabric, wherein the luggage box is foldable between a use configuration, in which the bottom element and the cover element are spaced apart from one another and the side walls connect the bottom element and the cover element, thus forming a luggage receiving space inside, and a transport configuration, in which the cover element lies on the bottom element and the side walls are folded in between the cover element and the bottom element.

The invention is based in the consideration to provide a foldable luggage box, which can be brought into a transport configuration, in which a space-saving transport or storage can be realized, and a use configuration, in which a luggage receiving space is formed inside. The side walls made of fabric are accordingly deformable such that they can be folded in between the cover element and the bottom element, when the luggage box should be brought into its transport configuration. The side walls may be releasably connected to the bottom element and the cover element, when the luggage box is in its use configuration, for example by means of a zipper, a Velcro fastener or other suitable mechanisms. In particular, the side walls are connected to the bottom element and the cover element over the entire circumference. Preferably, the side walls are designed such that they surround the luggage receiving space circumferentially.

According to a preferred embodiment, the bottom element is made of plastic and/or comprises a bottom plate and a circumferential border facing upwards. In the same way, the cover element may be made of plastic and/or may comprise a cover plate and a circumferential border facing downwards. Plastic is a suitable material to create a rigid bottom or cover element as it is relatively form stable and allows a light weight design. A bottom or cover plate and a circumferential border leads to a high mechanical stability of the bottom element and/or the cover element. Preferably, the bottom element and/or the cover element has a substantially rectangular shape in top view.

According to a preferred embodiment, the luggage box may comprise two support yokes held on opposite sections of the bottom element, which can be pivoted about a pivot axis between a support position, in which they extend upright from the bottom element so that they support the cover element in the use configuration, and a low position, in which the support yokes lie on the bottom element so that the cover element can be brought into the transport configuration. Accordingly, the mechanical stability of the luggage box in its use configuration can be achieved by means of two support yokes, which may be made of a bent profile that can be pivoted about a preferably horizontal pivot axis between a support position and a low position. The yokes may have the shape of a U, wherein the free ends are pivotably connected to the bottom element. Furthermore, the support yokes may be used to stabilize and to stretch the side walls made of deformable fabric. Preferably, the pivot axes of the support yokes are arranged on opposite sides of the luggage box, in particular on opposite sides at the ends of the longer edges of the rectangular shape.

In order to hold the support yokes in the support position, at least one, in particular two beam arrangements may be provided, by means of which the two support yokes are connected to each other when they are in their support position. Preferably, the beam arrangement(s) extend substantially horizontally when the support yokes are in their support position. In concrete terms, the beam arrangements may connect the support yokes in an upper section, i.e. spaced apart from the bottom element. In this way, a stable arrangement can be achieved when the yokes are in their support position.

Preferably, at least one, in particular exactly one beam arrangement comprises two end beam elements, each of which is fixed to a support yoke, and a central beam element, which can be releasably attached to the end beam elements by means of a locking mechanism, respectively, when the support yokes are in their support position. This design is based on the consideration to provide two end beam elements which remain permanently preferably at an upper section of both support yokes. A locking mechanism is provided by means of which a central beam element can be releasably attached to both end beam elements in order to fix the support yokes relative to each other.

In order to fix the end beam elements to the support yoke, they may comprise a recess having a shape complementary to the cross section of the support yoke and/or may be screwed to the support yoke. The recess may be formed such that it can receive the support yoke.

Each locking mechanism may comprise an engagement protrusion formed at the end beam element or at the central beam element, which is formed such the engagement protrusions can engage behind a corresponding engagement recess formed in the other of the two elements, namely the end beam element or the central beam element. Preferably, the engagement protrusion is formed in the shape of an L when viewed from above. Preferably, the first L-leg extends in the longitudinal direction of the corresponding beam arrangement, when the central beam element is attached to the end beam element, and the second L-leg extends perpendicularly to the longitudinal direction, so that it can engage behind a corresponding engagement recess. The engagement recess accordingly has also the shape of an L when viewed from above. In this way, it is safely avoided that the support yokes can move about their pivot axis relative to the bottom element of the luggage box, when the engagement protrusions engage into the engagement recesses.

In concrete terms, the engagement protrusions may be formed in the central beam element and the corresponding engagement recesses may be formed in the end beam elements. The locking mechanism may comprise a sliding element held movably at the end beam element or at the central beam element, preferably at the central beam element, between a locking position, in which the sliding element is in engagement with the other two elements, preferably the end beam element, in order to lock the central beam element at the end beam element, and a release position, in which the sliding element is out of engagement from the other of the two elements, preferably the end beam element, so that the central beam element can be brought out of engagement from the end beam element. In other words, the sliding element is used to create a further engagement of the central beam element at the end beam element. In a locking position, the sliding element creates an engagement such that the central beam element can not be released from the end beam element. Preferably, the sliding element is translationally movable in the direction of the first L-leg of the engagement protrusion, in particular in the longitudinal direction of the beam arrangement. The sliding element can be held movably at the central beam element and can be brought into engagement into a corresponding engagement deepening formed in the end beam element. In this way, the central beam element can be fixed relative to the end beam element, at first by the engagement protrusion, in particular the first L-leg, and, secondly, by the sliding element.

In order to move the sliding element into its release position, a release button may be provided. In concrete terms, the release button can be vertically moveably held in the end beam element or in the central beam element, preferably in the central beam element, and can cooperate with the sliding element in such a way that a vertical movement of the release button is converted into an horizontal movement of the sliding element. Preferably, the release button projects upwardly from the central beam element. In this way, it is accessible from upwards so that a downward movement of the release button is converted into an horizontal movement of the sliding element into its release position. For this purpose, the release button may carry a sliding bolt, which engages into a corresponding sliding groove formed in the sliding element, wherein the sliding groove extends obliquely with regard to the horizontal and vertical direction, so that a vertical movement of the release button is converted into an horizontal movement of the sliding element. Spring means may be provided, by means of which the release button is biased towards a position, which corresponds to the locking position of the sliding element.

It is not necessary that two beam arrangements, which are arranged on opposite sides of the support yokes, have the same design. Moreover, the luggage box may be characterized in that at least one, in particular exactly one beam arrangement comprises an elongated beam which has at its both ends connection means in particular in the form of snap-fit connections, by means of which the elongated beam can be connected directly to both support yokes. Accordingly, it is not intended, that end beam elements remain permanently at the support yokes, but at least one beam arrangement may be designed such that an elongated beams may be releasably attached with its ends to directly to the support yokes. In order to separate the beam arrangement from the support yokes, when they should be brought into their low position, a release mechanism in particular comprising a release lever may be provided. The release lever may be biased towards a position in which it engages around the support yokes so that a form-fit connection is realized between the elongated beam and the corresponding support yoke.

Preferably, the luggage box comprises in total two beam arrangements, wherein one rear beam arrangement comprises two end beam elements fixedly attached to each support yoke and a central beam element and one front beam arrangement comprises an elongated beam which can be directly releasably attached to the support yokes. This idea is based on the consideration that one beam element, in particular the elongated beam, can carry the cover element and the other beam arrangement comprising a central beam element can be fixed to the side walls made of fabric and zip fasteners can be provided at the transition between the central beam element and the end beam elements in order to create a further access to the luggage receiving space.

In concrete terms, one beam arrangement, in particular an elongated beam of a front beam arrangement, may carry at least one, in particular a plurality of hinge joints connected to the cover element, so that the cover element is pivotably fixed to one beam arrangement and can be pivoted relative to this beam arrangement between an open state, in which the luggage receiving space is accessible from the top, and a closed state, in which the luggage receiving space is fully enclosed from the top. Accordingly, in the use configuration, the cover element can be pivoted about hinge joints fixedly connected to one beam arrangement.

In order to block the cover element in the closed state, blocking means may be provided. They may comprise blocking hooks formed at the cover element and corresponding engagement means in order to block the cover element in the closed state. The corresponding engaging means may be provided at one beam arrangement, in particular at a central beam element of the beam arrangement. In addition, a locking cylinder may be provided to protect the luggage to be transported against theft.

The side walls made of fabric may be fixed to the beam arrangement and may comprise zip fasteners in order to get access to the inside of the luggage box in the use configuration.

The luggage box may further be characterized in that fastening means are provided by means of which the cover element can be fastened to the bottom element when the luggage box is folded in its transport configuration. In concrete terms, two fastening means may be arranged on opposite sides of the luggage box, each of which comprises a fastening lever, which is rotatably mounted to the cover element or the bottom element about an horizontally extending rotation axis, and a fastening element, which is rotatably mounted to the fastening lever, wherein the rotation axis of the fastening element relative to the fastening lever is spaced apart from the rotation axis of the fastening lever relative to the bottom or cover element, wherein the fastening element is able to engage a corresponding hook or a corresponding in particular circumferential projection formed in the other of the cover element or the bottom element, so that the fastening element can engage behind the hook in order to brace the cover element against the bottom element of the luggage box in its transport configuration. In this way, the cover element is safely fixed at the bottom element so that the luggage box can be transported or stored easily without the risk that the cover element moves with regard to the bottom element. In order to transport the luggage box easily, rollers may be provided at the bottom element so that the luggage box can be rolled on the ground. Preferably, a circumferential projection at the cover element and/or at the bottom element is formed such that it surrounds from the outside the side walls at a top/bottom end section of the latter.

In order to releasably attach the luggage box to a rear load carrier, it may comprise attachment means. These may comprise at least two, in particular four through-openings formed in the bottom element, which are arranged in such a way that the luggage box can be positioned above a rear load carrier such that the through-openings are located above corresponding grooves formed in the rear load carrier, in particular in profile rails extending in a transverse direction of a rear load carrier, so that a clamping device can be inserted and can be brought into engagement with the corresponding grooves of the rear load carrier in order to brace the bottom element of the luggage box against the rear load carrier. Furthermore, a deepening may be provided in the bottom of the luggage box adjacent to each through-opening, which deepening can receive the clamping lever of a clamping device in order to brace the bottom element against a rear load carrier.

Such a clamping device may comprise a clamping lever, a pivot joint, which is rotatably held at an end section of the clamping lever about a rotation axis, an elongated clamping pin, which is fixed to the pivot joint and extends perpendicularly to the rotation axis of the pivot joint, and a slot nut fixed to the free end of the clamping pin in a rotationally fixed manner, wherein the slot nut has a basically rectangular shape formed such that the slot nut can be inserted into a T-shaped groove of a rear load carrier when the longer edge of the rectangular shape is oriented in the lengthwise direction and, by rotation about the longitudinal axis of the clamping pin, can be brought into engagement behind the grooves such that the longer edge extends perpendicularly to the lengthwise direction in order to brace the luggage box to a rear load carrier. Due to the rectangular shape of the slot nut, it can be inserted into the T-shaped groove when the load receiving device is already positioned on the load carrier. Accordingly, it can be inserted through the narrow upper groove section when the slot nut is oriented such that the small edge extends perpendicularly to the lengthwise direction. Once the slot nut has reached the wide bottom groove section, it can be rotated such that the slot nut engages behind the upper groove section. In this way, the clamping device can be used to brace the luggage box to a rear load carrier.

Preferably, the clamping lever may be movable relative to the pivot joint between an insertion position, in which the clamping pin extends at least substantially in the same direction as the clamping lever, and a clamping position, in which the clamping pin extends at least substantially perpendicularly to the direction of the clamping lever. For this purpose, the clamping lever may comprise at the end section of the pivot joint a through-slot which divides the clamping lever, so that the elongated clamping pin can rotate freely about the rotation axis of the pivot joint relative to the clamping lever.

In order to clamp the luggage box to a profile rail, the clamping lever may comprise a clamping surface, which extends parallel to the rotation axis of the pivot joint and is spaced apart from the pivot joint such that the luggage box and the profile rail of the rear load carrier are pressed together between the slot nut and the clamping surface when the clamping lever is moved from its insertion position into the clamping position and the clamping surface comes into contact with a corresponding holding surface of the luggage box to be attached. In other words, the contact surface of the clamping lever is spaced apart from the pivot joint such that the profile rail and the load receiving device are clamped together between the slot nut and the contact surface of the clamping lever. Accordingly, the distance between the T-shaped groove and the holding surface formed in the bottom element of the luggage box is chosen such that the elements may be pressed together between the slot nut and the clamping surface of the clamping lever. Guiding projections may be formed in the holding surface in order to avoid an unintentional rotation of the clamping device when the clamping lever is in its clamping position and the clamping surface is in contact with the holding surface.

Elongated formings may be formed in the bottom element, which formings extend parallel to each other so that they can be brought into engagement with a corresponding profile rail of a rear load carrier having a concave outer contour. In this way, the luggage box can be positioned uniquely on a rear load carrier.

The luggage box may comprise a holding arrangement, which is designed such that it can be connected to a yoke of a rear load carrier. Preferably, the holding arrangement is designed such that the luggage box can be set from the top on a rear load carrier such that the holding arrangement encompasses the yoke from the top such that the luggage box is held at the yoke in a longitudinal direction and/or in a transverse direction. This design is based on the consideration to additionally stabilize the fixation of the luggage box at the rear load carrier. In concrete terms, the holding arrangement may comprise two holding elements, which are held at the luggage box, in particular held at a front beam arrangement, preferably are fixed thereto.

The holding elements may have a holding recess, which is formed to receive a section of a yoke of a rear load carrier. In other words, it may be provided that the yoke of a bike carrier can be brought into engagement into the holding recesses. The holding recesses may be formed such that they can receive a horizontal top section and an adjacent upright section of a yoke. Accordingly, the yoke can have the shape of a U so that the yoke can be brought into engagement into the holding recesses in a transition region between the central section and the U-legs. For this purpose, the holding recesses may be open towards the bottom and towards an inner side facing towards the other holding element. Preferably, the holding elements are arranged symmetrically to each other so that the holding recesses can be in engagement with the yoke from the outside and from the top, such that the holding elements encompass the yoke from the top and guide the luggage box relative to the yoke in a transverse direction in order to fix the luggage box in a longitudinal and a transverse direction at the yoke.

The object of the invention is also solved by a rear load carrier for mounting to a vehicle, with a base body, which defines a longitudinal direction between its front side and its rear side and a transverse direction, a connecting device for attachment to a vehicle-side trailer coupling provided at the front side of the base body, and fixing means, which are designed such that a luggage box can be attached in particular releasably to the rear load carrier and a luggage box attached to the rear load carrier.

Figure 2:
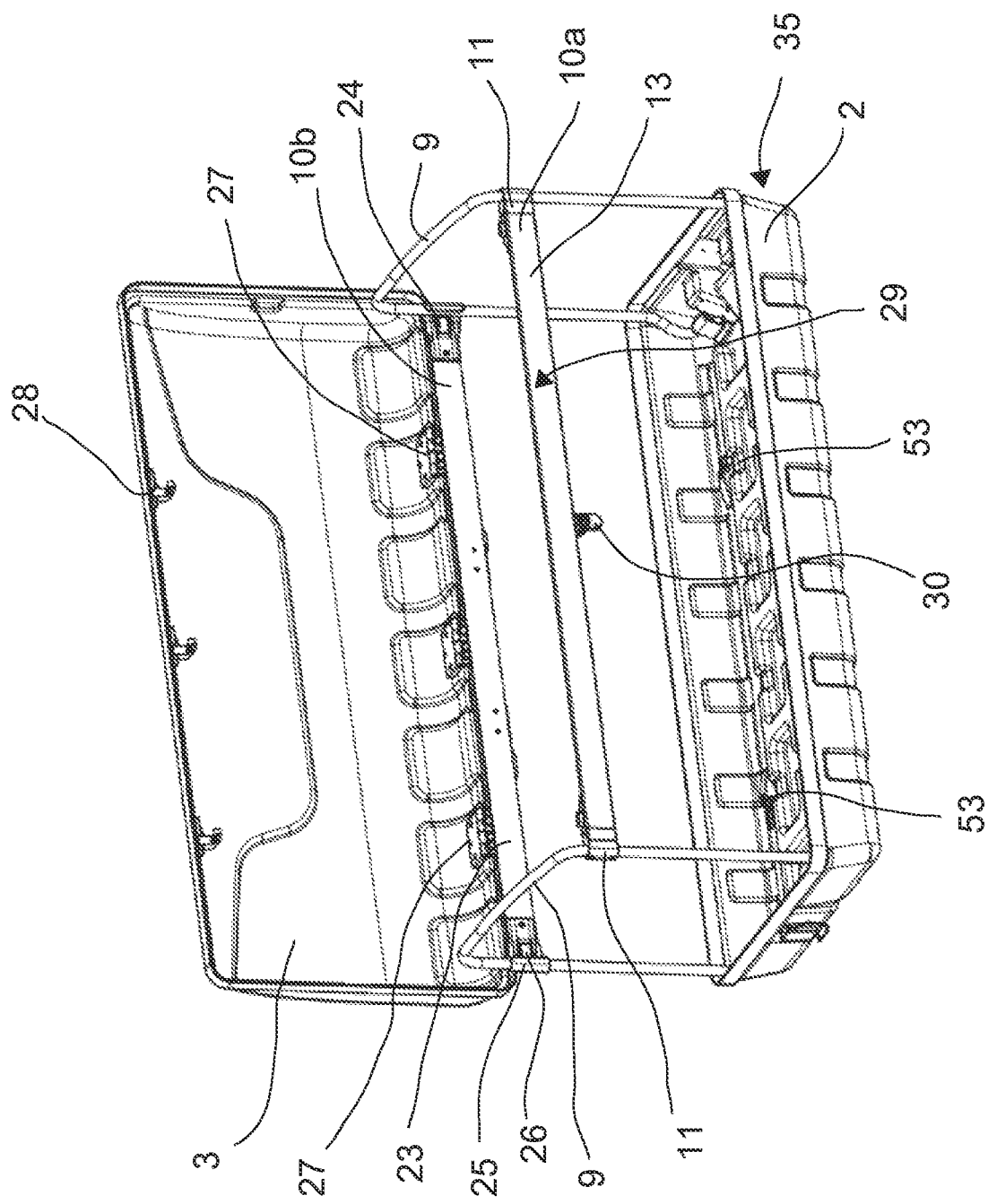
Figure 3:
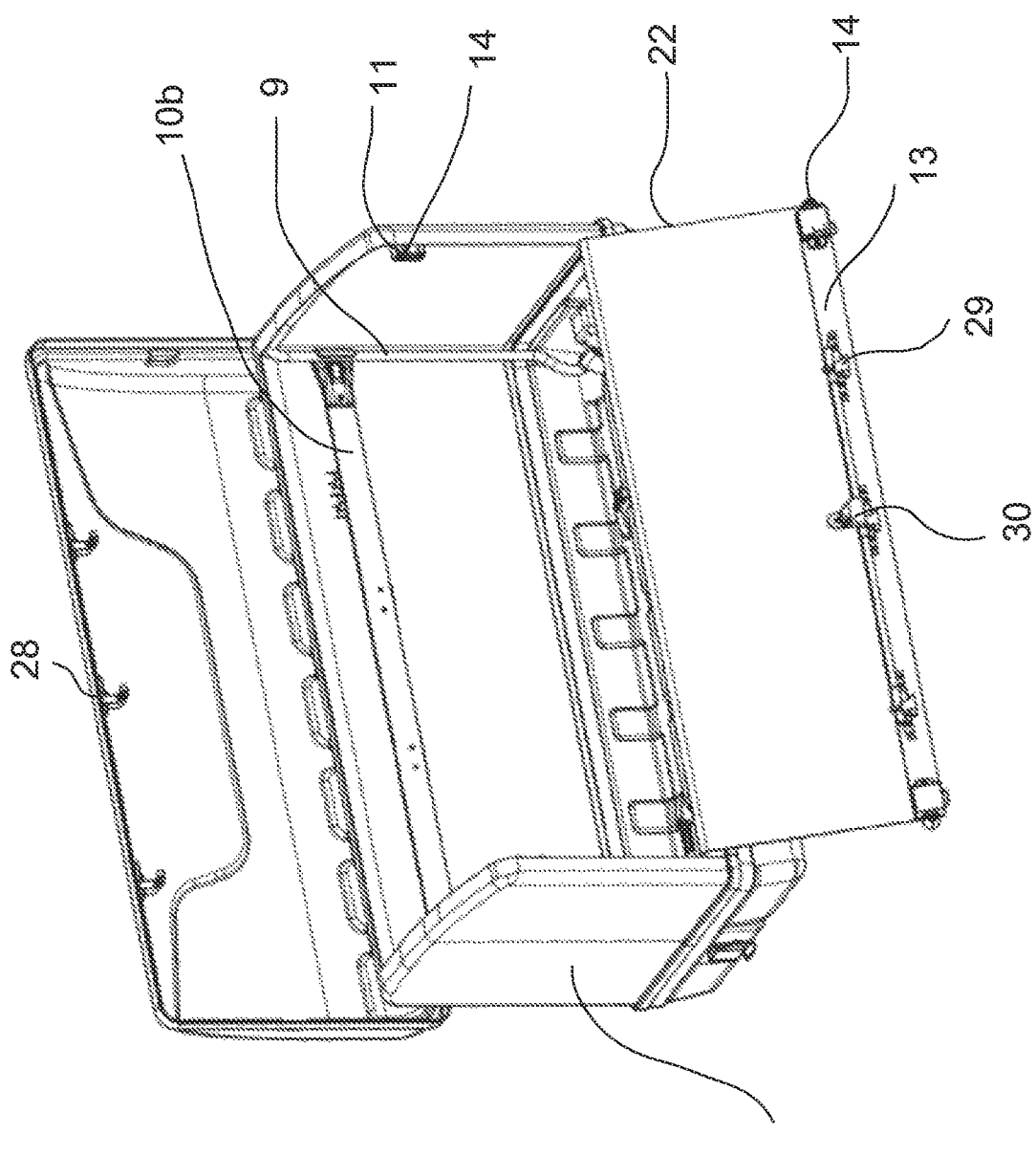
Figure 4:
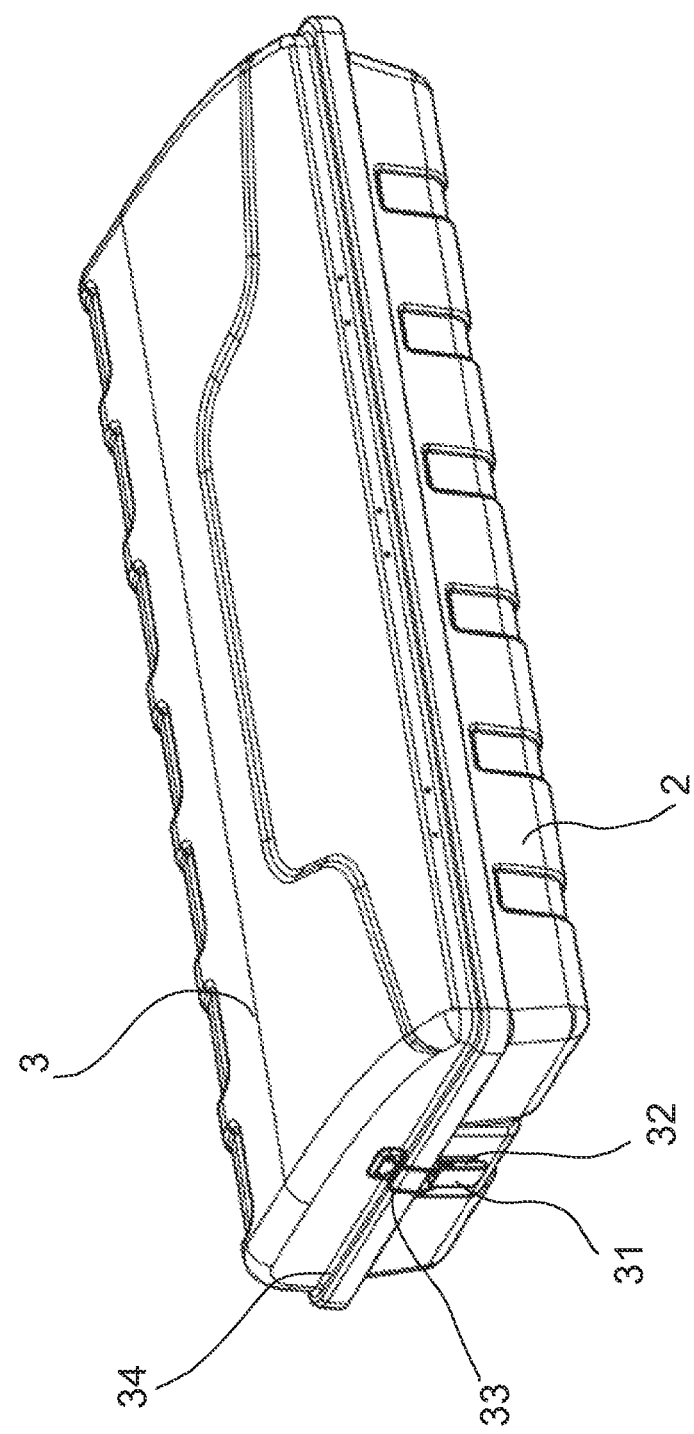
Figure 5:
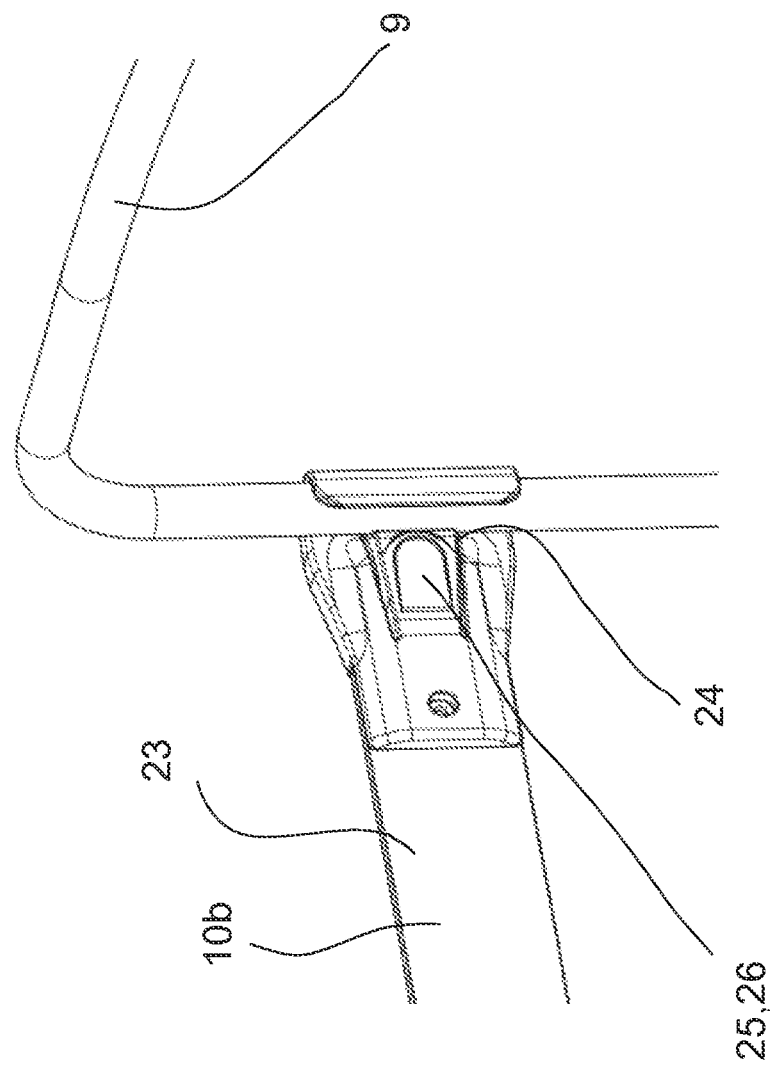
Figure 6:
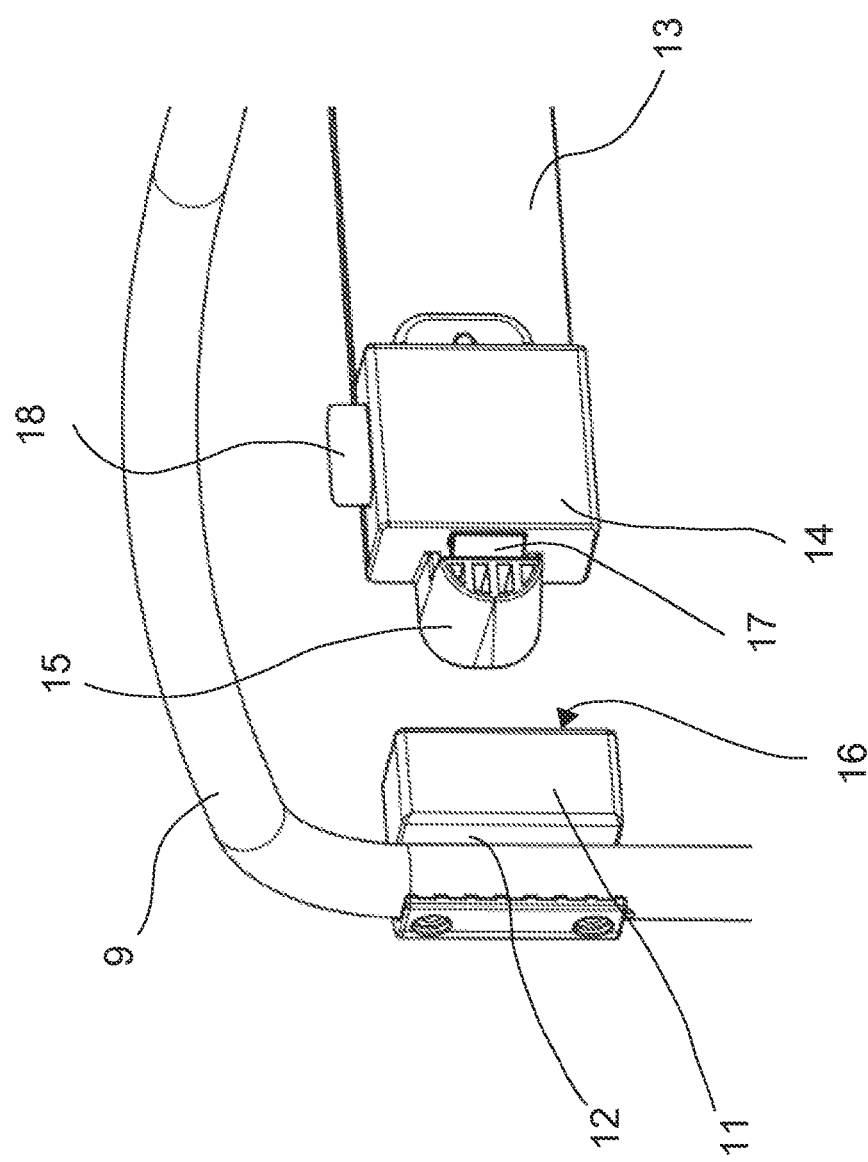
Figure 7:
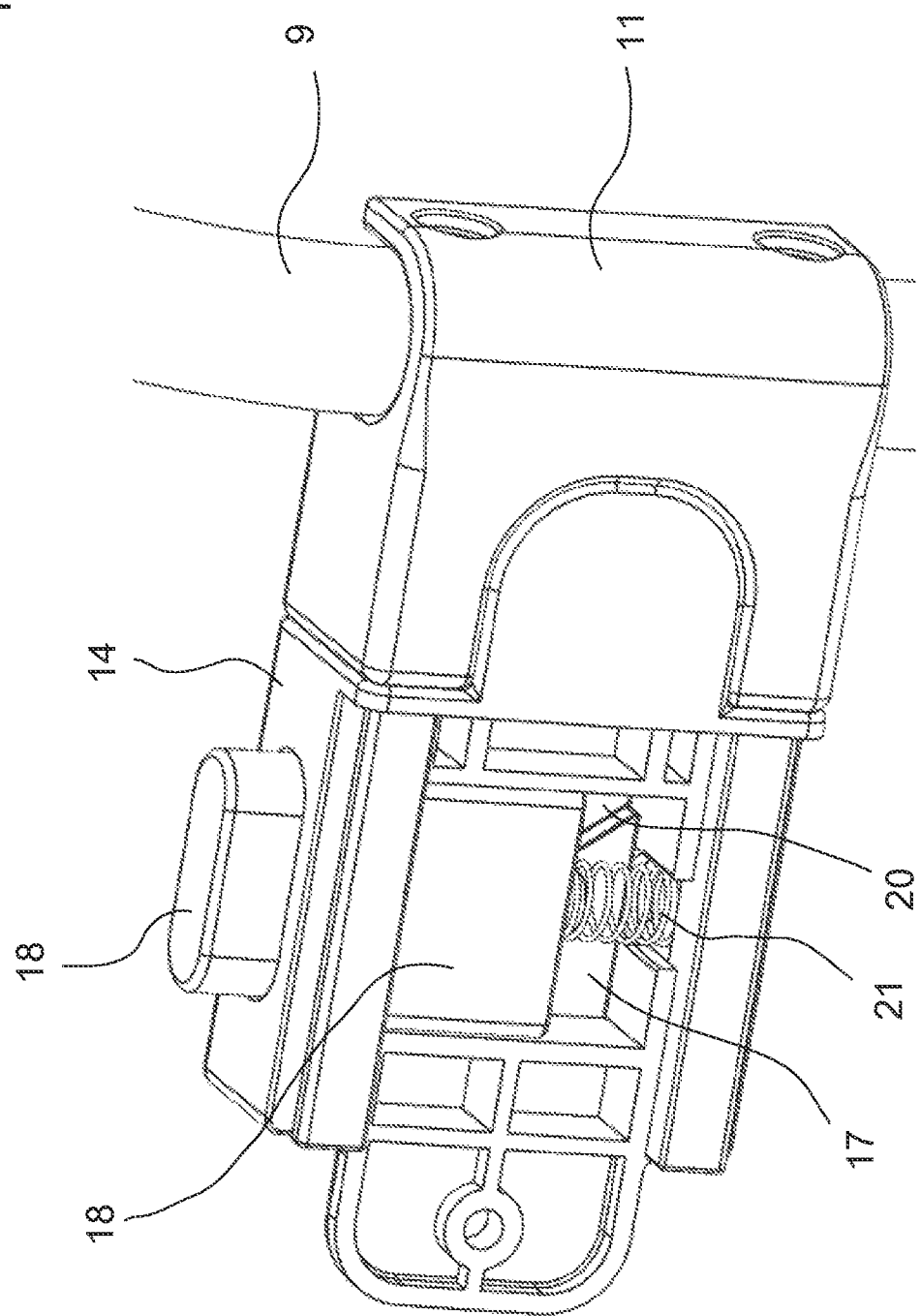
Figure 8:
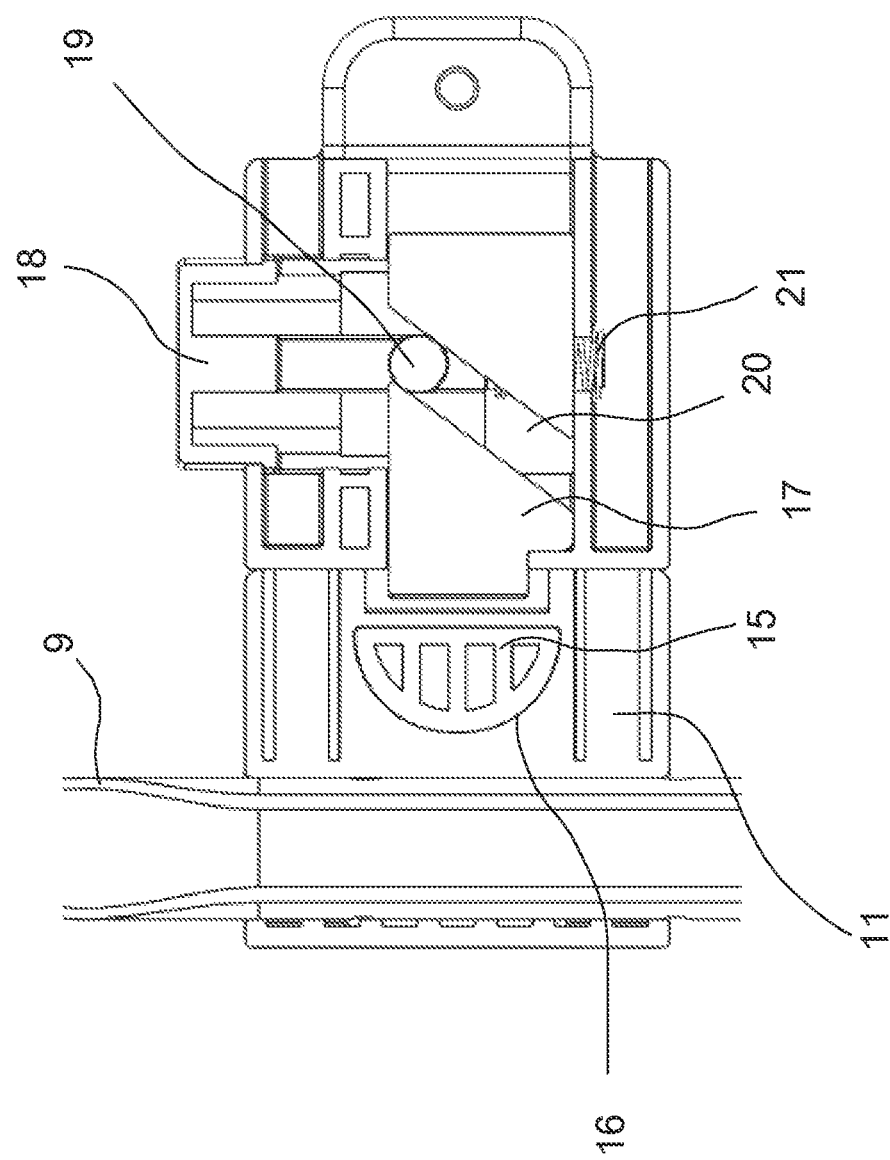
Figure 9:
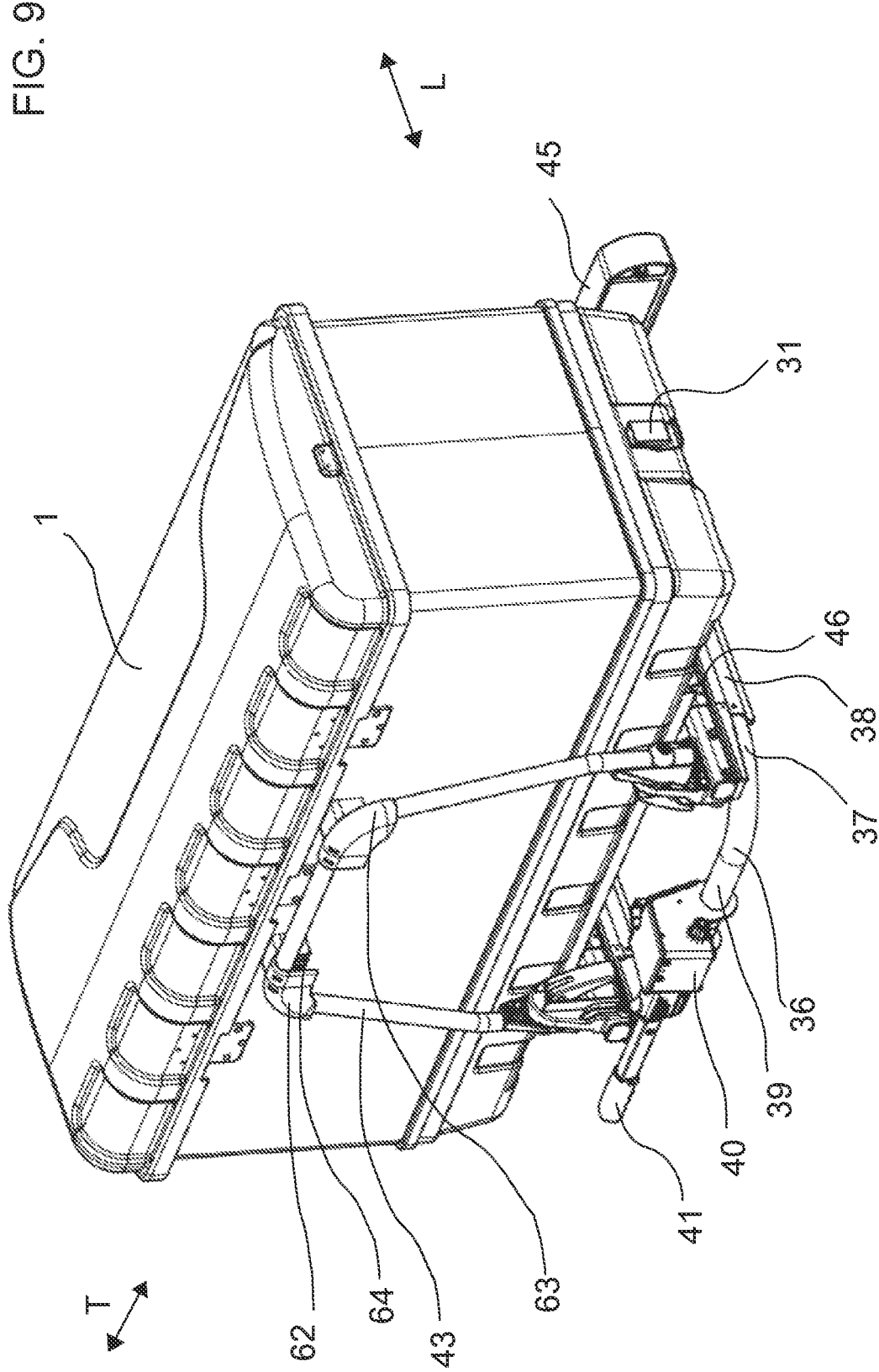
Figure 10:
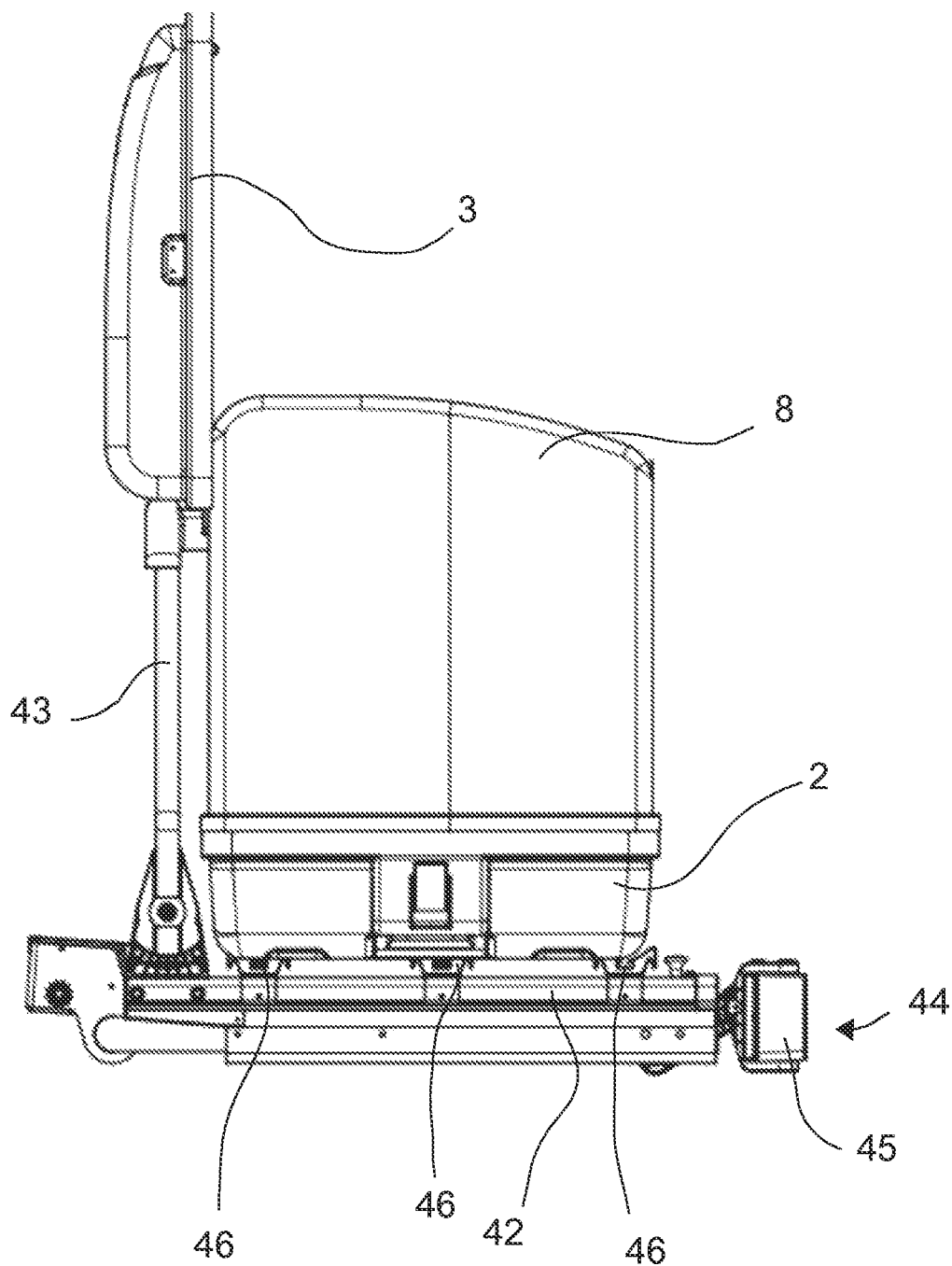
Figure 11:
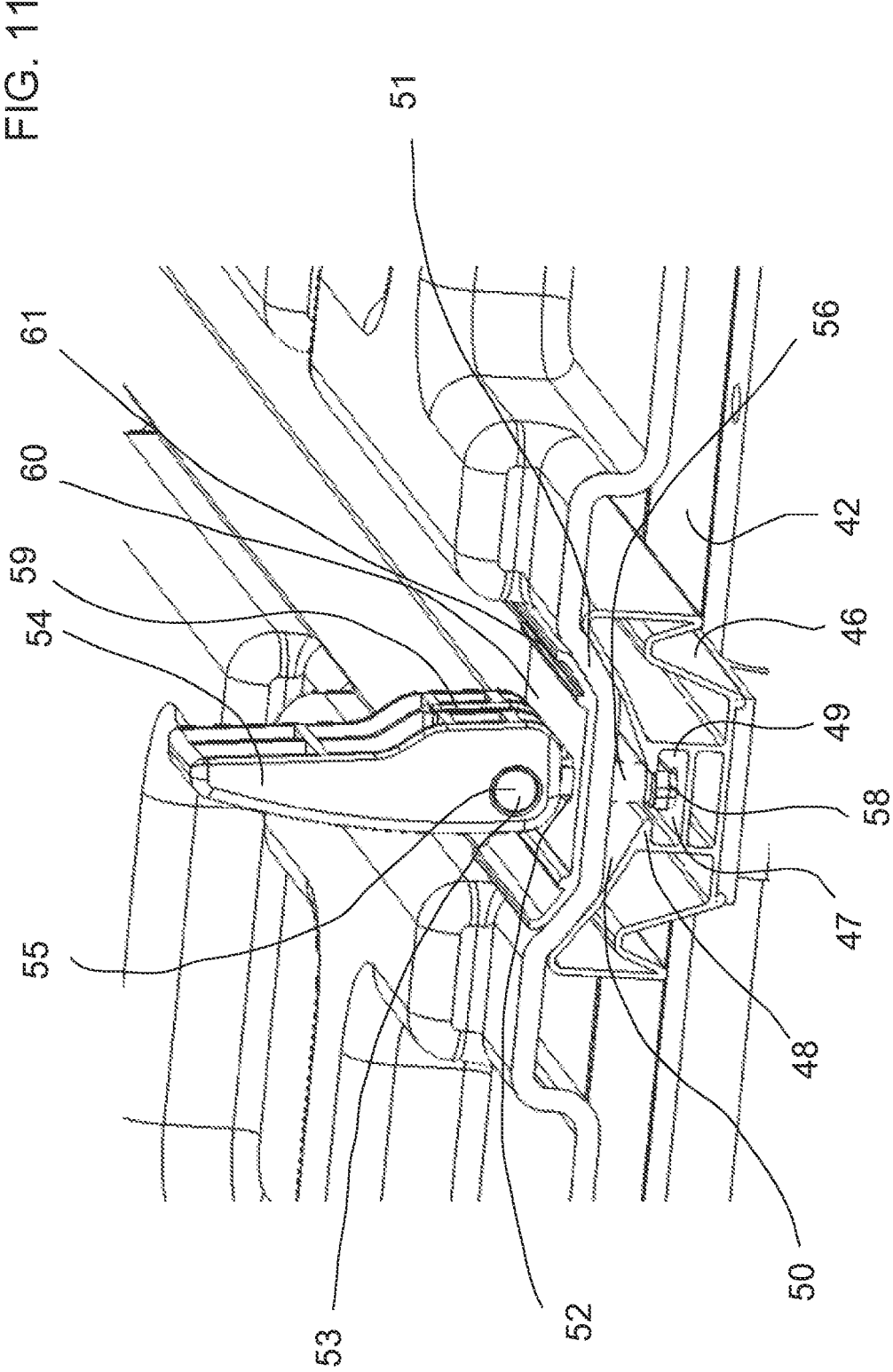

With regard to the embodiment of the invention, reference is also made to the subclaims and to the following description of an embodiment with reference to the attached drawing. The drawing shows as follows:

FIG. 1 a luggage box according to the invention in a perspective view;

FIG. 2 the luggage box of FIG. 1 without side walls and an open cover element;

FIG. 3 the luggage box of FIG. 1 with side walls and an open cover element;

FIG. 4 the luggage box of FIG. 1 in its transport configuration;

FIG. 5 the luggage box of FIG. 1 in a detailed perspective view of a support yoke and an adjacent part of a front beam arrangement;

FIG. 6 a part of the yoke and a corresponding rear beam arrangement with the locking mechanism of the luggage box in a perspective view;

FIG. 7 the locking mechanism shown in FIG. 6 in another perspective view;

FIG. 8 the locking mechanism shown in FIGS. 6 and 7 in a side view;

FIG. 9 the luggage box of FIG. 1 releasably attached to a rear load carrier in a perspective view;

FIG. 10 the arrangement shown in FIG. 9 in a side view, wherein the cover element of the luggage box is in its open state;

FIG. 11 the rear load carrier and the luggage box of FIGS. 9 and 10 in a detailed perspective view, wherein a clamping lever of a clamping device is in its insertion position; and FIG. 12 the arrangement shown in FIG. 11, wherein the clamping lever is in its clamping position FIGS. 1 to 8 show a luggage box 1 according to the invention. The luggage box 1 has a rigid bottom element 2 made of plastic and a rigid cover element 3 also made of plastic. The bottom element 2 comprises a bottom plate 4 and a circumferential border 5 facing upwards. In the same manner, the cover element 3 comprises a cover plate 6 of a substantially rectangular shape and a circumferential border 7 facing downwards. Furthermore, the luggage box 1 has side walls 8 made of a watertight fabric.

The luggage box 1 is foldable between a use configuration shown in FIGS. 1 to 3 and a transport configuration shown in FIG. 4. In the use configuration, the bottom element 2 and the cover element 3 are spaced apart from one another and the side walls 8 connect the bottom element 2 and the cover element 3, thus forming a luggage receiving space inside. In the transport configuration, the cover element 3 lies on the bottom element 2 and the side walls 8 made of fabric are folded in between the cover element 3 and the bottom element 2 in order to allow a space-saving transport and storage of the luggage box 1.

For this purpose, the luggage box 1 comprises two support yokes 9 which are held on opposite end sections of the bottom element 2. They can be pivoted about a pivot axis between a support position, which is shown in FIG. 2 for example, in which they extend upright from the bottom element 2, so that they support the cover element 3 in the use configuration, and a low position, in which the support yokes 9 lie on the bottom element 2 so that the cover element 3 can lie on the bottom element 2 in the transport configuration.

In order to hold the support yokes 9 in their support position, two beam arrangements 10a, b are provided, by means of which the two support yokes 9 are connected to each other when they are in their support position. One beam arrangement 10a is arranged at a rear side of the support yokes 9, whereas the other beam arrangement 10b is arranged at a front side of the support yokes 9. The beam arrangements 10a, b are not identical. Both beam arrangements 10a, b extend substantially horizontally and connect the support yokes 9 in an upper section.

The beam arrangement 10a comprises two end beam elements 11, each of which is fixed to a support yoke 9. Each end beam element 11 has a recess 12 which has a shape complementary to the cross section of the support yoke 9 so that it receives a section of the corresponding support yoke 9 and is screwed to the latter.

Furthermore, the beam arrangement 10a comprises a central beam element 13, which is formed as an elongated beam having a substantially rectangular cross section. The central beam element 13 can be releasably attached to the end beam elements 11 fixed to the support yokes 9 by means of a locking mechanism 14, when the support yokes 9 are in their support position.

Each locking mechanism 14 comprises one engagement protrusion 15 formed at an end of the central beam element 13 in the shape of an L, when viewed from above. The engagement protrusion 15 is formed such that it can engage behind a corresponding engagement recess 16 formed in the end beam element 11.

Furthermore, the locking mechanism 14 comprises a sliding element 17 held movably at the central beam element 13, in particular in a locking body arranged at the end of the central beam element 13, in its longitudinal direction between a locking position, in which the sliding element is in engagement with the end beam element 11 in order to lock the central beam element 13 at the end beam element 11, and a release position, in which the central beam element 13 can be brought out of engagement from the end beam element 11, in concrete terms out of an engagement deepening. In order to move the sliding element 17, a release button 18 is provided, by means of which the sliding element 17 can be moved into its release position. The release button 18 is moveably held in the vertical direction in the central beam element 13, in particular in a locking body arranged at the end of the central beam element 13, and cooperates with the sliding element 17 such that a vertical movement of the release button 18 is converted into an horizontal movement of the sliding element 17. For this purpose, the release button 18 carries a sliding bolt 19, which engages into a corresponding sliding groove 20 formed in the sliding element 17. The sliding groove 20 extends obliquely with regard to the horizontal and vertical direction, in concrete terms at an angle of about 55 degrees with respect to the horizontal direction. In this way, a vertical movement of the release button 18 is converted into an horizontal movement of the sliding element 17. Spring means in the form of a helical compression spring 21 are provided, by means of which the release button is biased towards the position, which corresponds to the locking position of the sliding element 17.

The beam arrangement 10a is characterized in that the central beam element 13 is connected to a section of the side walls 8 made of fabric. At the connection between the central beam element 13 and the end beam elements 11, a vertically extending zipper 22 is provided in the side wall section in order to allow access to the interior of the luggage box as it is shown in FIG. 3.

The other beam arrangement 10b is designed in another way. It comprises an elongated beam 23. At its both ends, this elongated beam 23 carries snap-fit connections 24, by means of which the elongated beam 23 can be connected to both support yokes 9. In these snap-fit connections 24, a corresponding release mechanism 25 is provided, which an be actuated by pushing a release lever 26. In this way, the support yokes 9 can be brought out of engagement from the elongated beam 23, when the support yokes 9 should be moved towards their low position.

The elongated beam 23 carries a plurality of hinge joints 27 connected to the cover element 3, so that the cover element 3 is pivotably attached to the elongated beam and can be pivoted relative to this between an open state, which is shown in FIG. 3, and a closed state, which is for example shown in FIG. 1.

In order to block the cover element 3 in its closed state, corresponding blocking means are provided. These comprise blocking hooks 28 formed at the cover element 3 and corresponding engaging means 29 in order to block the cover element 3 in a closed state. Furthermore, a locking cylinder 30 is provided by means of which an unintended access to the luggage receiving space can be avoided.

The luggage box 1 further comprises fastening means by means of which the cover element 3 can be fastened to the bottom element 2, when the luggage box is folded in its transport configuration, as shown in FIG. 4. In concrete terms, the fastening means comprise two fastening devices 31, which are arranged on opposite sides of the luggage box 1. Each fastening device 31 comprises a fastening lever 32, which is rotatably mounted to the bottom element 2 about an horizontally extending rotation axis. Furthermore, the fastening devices 31 comprise a fastening element 33 made of a bent wire, which is rotatably mounted to the fastening lever 32, wherein the rotation axis of the fastening element 33 relative to the fastening lever 32 is spaced apart from the rotation axis of the fastening lever 32 relative to the bottom element. The fastening element 33 is able to engage a corresponding hook or a corresponding circumferential projection 34 formed in the cover element 3, so that the fastening element 33 can engage behind the circumferential projection 34 in order to brace the cover element 3 against the bottom element 2. At one end section of the luggage box 1, rollers 35 are provided at the bottom element 2, so that the luggage box 1 can be rolled on the ground.

In FIGS. 9 to 12, the luggage box is releasably attached to a rear load carrier 36. The rear load carrier 36 comprises a base body 37 which defines a longitudinal direction L between its front side and its rear side and a transverse direction T. In concrete terms, the base body 37 has the shape of a C open towards the rear side and comprises two base profiles 38 extending in the longitudinal direction L. The base profiles 38 are, at their front end, connected to each other by means of a central section 39 of the base body 37.

At the central section 39, a connecting device 40 for attachment to a vehicle-side trailer coupling is provided. This connecting device 40 comprises an actuating lever 41, which can be pivoted about a pivot axis extending in the longitudinal direction L.

The rear load carrier 36 further comprises two sliding profiles 42, which are held at the base profiles 38 and can be moved relative to them in the longitudinal direction L. At the front end of the sliding profiles 42, a yoke 43 is attached in order to support a load to be transported on the rear load carrier 1. The yoke 43 has the shape of a U open towards the bottom and is attached to the sliding profiles 42 such that it can be moved relative to them between an upright position, which is shown in FIG. 9, and an at least substantially horizontal position, in which the yoke 43 lies on the base body 37. At the rear end of the sliding profiles 42, a license plate holder 44 and two rear light units 45 are attached.

The rear load carrier 36 comprises fixing means in the form of three profile rails 46 extending in the transverse direction, which are fixed to the sliding profiles 42. The three profile rails 46 are each spaced apart from an adjacent profile rail 46 at the same distance and the profile rails 46 have an identical cross-section over their entire, identical length. The profile rails 46 comprise a groove 47 having a T-shaped cross section extending in the lengthwise direction of the profile rail 46. The T-shaped groove 47 is open towards the upper side and is arranged centrally in the profile rail 46. This means that the T-shaped groove 47 comprises a narrow upper groove section 48 and a wide bottom groove section 49, so that the bottom groove section 49 undercuts the upper groove section 48. Towards their upper side, the profile rails 46 have a concave outer contour 50, in which the T-shaped groove 47 is arranged centrally.

Two elongated formings 51 are formed in the bottom element 2 of the luggage box which are in engagement with the concave outer contour 50 of the two front profile rails 46. The elongated formings 51 extend parallel to each other and are spaced apart from each other at the same distance as the distance between two adjacent profile rails 46. In this way, the luggage box 1 is positioned on the rear load carrier 36.

In order to attach the luggage box 1 to the rear load carrier 1, in total four through-openings 52 are formed in the bottom element 2. The through-openings are arranged in such a way that they are located above the T-shaped grooves 47 formed in the profile rails. Presently, two through-openings 52 are located above the T-shaped groove 47 of the front profile rail 46 and two further through-openings 52 are located above the middle profile rail 46.

A clamping device 53 is assigned to each through-opening 52. The clamping device 53 is visible on FIGS. 11 and 12 in detail. It comprises a clamping lever 54, a pivot joint 55, which is rotatably held at an end section of the clamping lever 54. Furthermore, the clamping device 53 comprises an elongated clamping pin 56, which is fixed to the pivot joint 55 and extends perpendicularly to the rotation axis of the pivot joint 55. In order to allow a movement of the elongated clamping pin 56, the clamping lever 54 comprises at the end section of the pivot joint 55 a through-slot 57, which divides the clamping lever 54 so that the elongated clamping pin 56 can rotate freely about the rotation axis of the pivot joint 55 relative to the clamping lever 54.

At the free end of the clamping pin 56, a slot nut 58 is fixed in a rotationally fixed manner. The slot nut 58 has a basically rectangular shape. The rectangular shape is formed such that the slot nut 58 can be inserted into the T-shaped groove 47 when the longer edge of the rectangular shape is oriented in the lengthwise direction of the T-shaped groove 47. This situation is shown in FIG. 11. By rotation about the longitudinal axis of the clamping pin 56, a slot nut 58 can be brought into engagement behind the groove 47, such that the longer edge extends perpendicularly to the lengthwise direction of the profile rail. This configuration is shown in FIG. 12.

In order to brace the bottom element 2 against the profile rail 46, the clamping lever 54 is movable relative to the clamping pin 56 between an insertion position, in which the clamping pin 56 extends at least substantially in the same direction as the clamping lever 54 (shown in FIG. 11) and a clamping position, in which the clamping pin 56 extends substantially perpendicularly to the direction of the clamping lever 54 (shown in FIG. 12). As it is visible in FIG. 12, the slot nut 58 is arranged relative to the clamping lever 54 such that, when the slot nut 58 engages behind the T-shaped groove 47 of the profile rail 46, the clamping lever 54 extends in the lengthwise direction of the profile rail 46.

The clamping lever 54 comprises a clamping surface 59 which extends parallel to the rotation axis of the pivot joint 55 and is spaced apart from the pivot joint 55 such that the bottom element 2 and the profile rail 46 are pressed together between the slot nut 58 and the clamping surface 59, when the clamping lever 54 is in its clamping position and the clamping surface 59 is in contact with the corresponding holding surface 60 of the bottom element 2, as it is shown in FIG. 12. The clamping lever 54 may be guided by elongated guiding projections 61 protruding upwards from the holding surface 60 in order to avoid an unintentional rotation of the clamping device 53 about the longitudinal axis of the elongated clamping pin 56. In this way, it is avoided that the slot nut 58 comes out of engagement from the T-shaped groove 47 unintentionally.

In order to further stabilize the fixation of the luggage box 1 at the rear load carrier 36, a holding arrangement is provided, which is held at the luggage box 1 and is designed such that it can be fixed to the yoke 43 of the rear load carrier 36—as it is visible in FIG. 9. In concrete terms, the holding arrangement comprises two holding elements 62, 63, which are fixed to the elongated beam 23 of the front beam arrangement 10b and which are spaced apart from each other in the transverse direction T. The holding elements 62, 63 are formed and arranged symmetrically to each other with respect to a central vertical plane.

Both holding elements 62, 63 may have a holding recess 64, which is formed to receive a section of the yoke 43 of the rear load carrier 36. The holding recesses 64 are formed such that they can receive a horizontal top section and an adjacent upright section of the yoke 43. Accordingly, the yoke 43 having the shape of a U can be brought into engagement into the holding recesses 64 in both transition regions between the central section and the U-legs. In this way, the holding recesses 64 are in engagement with the yoke 43 from both lateral sides and from the top, so that the luggage box 1 is safely fixed in the longitudinal direction L and the transverse direction T.

LIST OF REFERENCE SIGNS 1 luggage box
2 bottom element
3 cover element
4 bottom plate
5 border
6 cover plate
7 border
8 side walls
9 support yoke
10a beam arrangement
10b beam arrangement
11 end beam element
12 recess
13 central beam element
14 locking mechanism
15 engagement protrusion
16 engagement recess
17 sliding element
18 release button
19 sliding bold
20 sliding groove
21 helical compression spring
22 zipper
23 elongated beam
24 snap fit connection
25 release mechanism
26 release lever
27 hinge joint
28 blocking hook
29 engaging means
locking cylinder
31 fastening device
32 fastening lever
33 fastening element
34 circumferential projection
35 roller
36 rear load carrier
37 base body
38 base profile
39 central section
40 connecting device
41 actuating lever
42 sliding profile
43 yoke
44 license plate holder
45 rear light unit
46 profile rail
47 T-shaped groove
48 upper groove section
49 bottom groove section
50 concave outer contour
51 elongated formings
52 through-openings
53 clamping device
54 clamping lever
55 pivot joint
56 elongated clamping pin
57 through-slot
58 slot nut
59 clamping surface
60 holding surface
61 guiding projection
62 holding element
63 holding element
64 holding recess
L longitudinal direction
T transverse direction

The invention claimed is:

1. Luggage box, in particular for releasable attachment to a rear load carrier to be mounted to a vehicle, the luggage box comprising
   a rigid bottom element,
   a rigid cover element, and
   side walls made of fabric,
   wherein the luggage box is foldable between a use configuration, in which the bottom element and the cover element are spaced apart from one another and the side walls connect the bottom element and the cover element, thus forming a luggage receiving space inside, and a transport configuration, in which the cover element lies on the bottom element and the side walls are folded in between the cover element and the bottom element, wherein the luggage box comprises two support yokes held on opposite sections of the bottom element, which can be pivoted about a pivot axis between a support position, in which they extend upright from the bottom element so that they support the cover element in the use configuration, and a low position, in which the support yokes lie on the bottom element so that the cover element can lie on the bottom element in the transport configuration;
   wherein at least one beam arrangement is provided, by means of which the two support yokes are connected to each other when they are in their support position, wherein the at least one beam arrangement extends substantially horizontally when the support yokes are in their support position and/or the at least one beam arrangement connects the support yokes in an upper section;
   wherein the at least one beam arrangement comprises two end beam elements, each of which is fixed to a support yoke, and a central beam element, which can be releasably attached to the end beam elements by means of a locking mechanism respectively, when the support yokes are in their support position, wherein the end beam elements comprise a recess having a shape complementary to the cross section of the support yoke and/or are screwed to the support yoke.

2. Luggage box according to claim 1, characterized in that at least one, in particular exactly one beam arrangement comprises an elongated beam which has at its both ends connection means in particular in the form of snap-fit connections, by means of which the elongated beam can be connected to both support yokes, wherein a release mechanism in particular comprising a release lever are provided.

3. Luggage box according to claim 1, characterized in that the luggage box comprises a holding arrangement, which is designed such that it can be connected to a yoke of a rear load carrier, wherein, in particular, the holding arrangement comprises two holding elements, which are held at one beam arrangement, in particular are fixed thereto, each of which holding elements have a holding recess which is formed to receive a section of a yoke of a rear load carrier, wherein the holding recesses are formed such that they receive a horizontal section and an adjacent upright section of a yoke of a rear load carrier.

4. Luggage box according to claim 1, characterized in that each locking mechanism comprises one engagement protrusion formed at the end beam element or at the central beam element, which is formed such that it can engage behind a corresponding engagement recess formed in the other of the two elements.

5. Luggage box according to claim 4, characterized in that the engagement protrusion is formed in the shape of an L when viewed from above, and/or in that the engagement protrusion is formed in the central beam element and the corresponding engagement recess is formed in the end beam element.

6. Luggage box, in particular for releasable attachment to a rear load carrier to be mounted to a vehicle, the luggage box comprising
    a rigid bottom element,
    a rigid cover element, and
    side walls made of fabric,
    wherein the luggage box is foldable between a use configuration, in which the bottom element and the cover element are spaced apart from one another and the side walls connect the bottom element and the cover element, thus forming a luggage receiving space inside, and a transport configuration, in which the cover element lies on the bottom element and the side walls are folded in between the cover element and the bottom element, wherein the luggage box comprises two support yokes held on opposite sections of the bottom element, which can be pivoted about a pivot axis between a support position, in which they extend upright from the bottom element so that they support the cover element in the use configuration, and a low position, in which the support yokes lie on the bottom element so that the cover element can lie on the bottom element in the transport configuration; and
    a holding arrangement, which is designed such that it can be connected to a yoke of a rear load carrier, wherein the holding arrangement comprises two holding elements, which are held at one beam arrangement, in particular are fixed thereto, each of which holding elements have a holding recess which is formed to receive a section of a yoke of a rear load carrier, wherein the holding recesses are formed such that they receive a horizontal section and an adjacent upright section of a yoke of a rear load carrier.

* * * * *